(12) United States Patent
Luong (10) Patent No.: US 7,899,393 B2
(45) Date of Patent: Mar. 1, 2011

(54) METHOD AND DEVICE FOR FAST NEAR-FIELD COMMUNICATION

(75) Inventor: Jean-Luc Luong, Caen (FR)

(73) Assignee: NXP B.V., Eindhoven (NL)

( * ) Notice: Subject to any disclaimer, the term of this patent is extended or adjusted under 35 U.S.C. 154(b) by 1005 days.

(21) Appl. No.: 11/576,458

(22) PCT Filed: Sep. 7, 2005

(86) PCT No.: PCT/IB2005/052914

§ 371 (c)(1),
(2), (4) Date: Mar. 30, 2007

(87) PCT Pub. No.: WO2006/035331

PCT Pub. Date: Apr. 6, 2006

(65) Prior Publication Data

US 2009/0004969 A1    Jan. 1, 2009

(30) Foreign Application Priority Data

Sep. 30, 2004   (EP) .................................. 04300642

(51) Int. Cl.
*H04B 5/00*   (2006.01)
(52) U.S. Cl. .................................... 455/41.1
(58) Field of Classification Search .............. 455/41.1
See application file for complete search history.

(56) References Cited

U.S. PATENT DOCUMENTS 5,778,186 A * 7/1998 Funaya .................. 709/231

2005/0111420 A1 * 5/2005 Fujii ........................ 370/338

FOREIGN PATENT DOCUMENTS

EP       1009180 A2    6/2000

OTHER PUBLICATIONS

"Near Field Communication (NFC) IP-1; Interface and Protocol (NFCIP-1); ETSI TS 102 190"; ETSI Standards European Telecommunications Standards Institute Sophia-Antipo FR; vol. ECMATC32 No. V111; Mar. 2003.

* cited by examiner

*Primary Examiner*—Matthew D Anderson
*Assistant Examiner*—David Bilodeau (57) ABSTRACT

The present invention relates to a communication device (28) adapted to communicate with at least one second communication device (26) in a half-duplex near-field communication scheme, and to a method of near-field communication. According to the invention the first communication device (28) receives a first request message (30) from the second communication device (26) which is supposed to be answered within a first response waiting time span (bRWT), and which contains an amount of request data. The first communication device (28) sends within the first response waiting time span (bRWT) a second request message (34) to the second communication device (26), the second request message (34) representing a request for a second response waiting time span (RWT(m)) for providing a first response message (32) in reply to the first request message (30). According to the invention, the first communication device (28) ascertains a value of the requested second response waiting time span (RWT(m)), such that the value of the requested second response waiting time span (RWT(m)) generally increases with the amount of request data.

6 Claims, 5 Drawing Sheets

METHOD AND DEVICE FOR FAST NEAR-FIELD COMMUNICATION

FIELD OF THE INVENTION

The invention relates to a communication device adapted to communicate with at least one second communication device in a half-duplex near-field communication scheme. It further relates to a method for half-duplex near-field communication between a first communication device and a second communication device. The invention also relates to a data medium containing coded instructions, which are to be interpreted by a processing unit of a first communication device for performing operations in the framework of a half-duplex near-field communication scheme between the first communication device and a second communication device.

BACKGROUND OF THE INVENTION

Near Field Communication (NFC) is a communication technology, which uses an inductive coupling of devices for a wireless interconnection between them. Two devices equipped with NFC technology set up a near-field communication link when their NFC interfaces are positioned close to each other within 20 cm or less or are brought in contact with each other. The NFC interfaces of the devices link up in a peer-to-peer network.

As a wireless communication technology among a multitude of others, NFC has been designed with a view especially to signal and data exchange between consumer electronics devices. NFC technology can for instance be used to exchange configuration data in the process of setting up a longer-range or faster communication link of another technology like Bluetooth or wireless Ethernet. Examples of consumer electronics devices to be equipped with NFC communication capabilities are television devices, radio receivers, stationary or mobile telephones, laptop or handheld computers, or the like. Such devices will also be referred to as communication devices hereinafter, even though their primary function may not always be communication.

NFC communication devices operate at a center frequency of 13.56 MHz. The current NFC protocol is defined by the standard ECMA 340 of December 2002 and will be outlined in the following paragraphs.

A peer-to-peer NFC communication uses a half-duplex communication scheme. That means, at any one time communication is allowed only in one of the two possible directions. For instance, a second communication device initiating the communication (hereinafter also referenced as "initiator device" or "initiator") sends a request message to a first communication device (hereinafter also referenced as "target device" or "target"). After having sent the request message, the initiator cannot send another request message to the same target before a response message has been received from that target. However, the initiator device can in the meantime communicate according to the same half-duplex scheme with one or more additional target devices, which in the mentioned standard is referred to as a multiactivation mode. On the other hand, a communication device that has taken on the role of a target in an NFC exchange can communicate with only the initiator of that communication. It should be noted that the terms "initiator" and "target" give a functional meaning to the first and the second communication device. This function can change with time so that the first communication device can be target at a first time and initiator at a second time. The same applies to the second communication device accordingly.

According to the NFC standard, two alternative physical communication modes can be used. These modes are known as the active and the passive communication mode, respectively. In the active communication mode, an initiator and a target generate and use their own radio frequency (RF) field to enable communication. The initiator starts the communication. The target responds to an initiator command or request in the active communication mode using a self-generated modulation of the self-generated RF field. In a passive communication mode it is again the initiator that generates the RF field and starts the communication. The target, however, responds to an initiator request using a load modulation scheme, i.e., by modulating the RF field generated by the initiator and without generating its own RF field.

In the exchange of request and answer, the initiator has no timing restrictions, whereas the target has only a limited time span to provide an answer. This time span is called basic response waiting time span (bRWT) herein. The bRWT has a constant value throughout a communication session.

The bRWT is communicated during the setup of a communication between initiator and target. The initiator sends a request for communication parameters, the so called Attribute Request, to the target. The target responds with an Attribute Response message containing a Timeout (TO) byte specifying the timeout value of the target for the transport protocol. The TO byte has four bits defining an integer WT, from which the bRWT is calculated as $$bRWT=(256\times16/fc)\times2^{WT}$$

In this equation, fc is the frequency of the operating field (the carrier frequency).

If the target needs more time than the bRWT to process an incoming request, it can send a request for an additional waiting time span, also referred to as waiting time extension, up to a number of N times the bRWT. Thus, an intermediate response waiting time span $RWT_{INT}$ is defined as $$RWT_{INT}=bRWT\times N$$

According to the standard mentioned above, the factor N is defined as an integer between 0 and 59 and coded in the request by 6 Bytes called RTOX. If the target receives a so called RTOX Response message from the initiator, the initiator will wait for the response message until the end of the additional waiting time span $RWT_{INT}$, counted from the transmission of the RTOX Response message. Of course, the initiator will stop waiting before the end of that time span only when it receives a next frame from the target.

While the standard allows the intermediate response waiting time span $RWT_{INT}$ to take on a range of values, it does not provide a way how to determine the factor N. Current NFC devices thus neither have a tool to predict the time span they need before providing a response message, nor to predict whether an extension of the bRWT will be necessary at all. Providing such tools is costly. As a consequence, it is the common practice for target devices to always request an additional waiting time span, and to always request the maximum allowable value of the parameter N (59), thus extending the waiting time span on the side of the initiator to the maximum allowable value.

Due to the half-duplex nature of the communication, which is mandatory in NFC, the initiator is not allowed to send other request messages to the target during the waiting time span, and only waits for the response message from the target. Therefore, NFC peer-to-peer communication is rather slow.

Prior art communication methods do not provide a solution that can be adapted in the present context. EP 1 009 180 A2 describes a method for managing the limited transmission capacity of a multiplexed bidirectional satellite link, i.e., a satellite channel that at the same time provides a multitude of individual communication links between a larger number of mobile stations and one base transceiver station. The transmission capacity of the satellite link is managed in order to mitigate traffic overload situations. A signaling protocol is described, which allows a transmission of user data by a mobile station only after a request for permission, which is to be granted by the base transceiver station. A mobile station repeats the request for permission if it does not receive permission within a waiting time span after the last transmission of the request. The waiting time span is mandatory for all mobile stations. In times of a high traffic load of user data over the satellite link, the usage of the satellite link for mere signaling, i.e., transmitting requests for permission, is reduced by means of communicating a larger value of the waiting time span to the mobile stations.

The method of EP 1 009 180 A2 is custom-tailored to the characteristics of a multiplexed communication link concurrently used by many devices. Application of this method to NFC communication would result in adverse effects. Instead of accelerating the half-duplex peer-to-peer NFC communication, an additional signaling protocol feature comprising the exchange of a request for permission to transmit user data and a response granting permission between NFC initiator and NFC target would introduce an extra communication delay.

OBJECT AND SUMMARY OF THE INVENTION

It is an object of the present invention to provide a communication device working in a half-duplex near-field communication scheme, which allows accelerated communication with at least one second communication device.

It is a further object to provide a method for half-duplex near-field communication between a first communication device and a second communication device, in which communication is accelerated.

It is a further object to provide a data medium containing coded instructions, which are to be interpreted by a processing unit of a first communication device for performing operations in the framework of a half-duplex near-field communication scheme between the first communication device and a second communication device, and which allow accelerated communication between the first and second communication devices.

According to a first aspect of the invention, a communication device is provided, adapted to communicate with at least one second communication device (hereinafter also referenced as "initiator or "initiator device") in a half-duplex near-field communication scheme, further adapted to:

receive a first request message from the second communication device which is supposed to be answered within a first response waiting time span, and which contains an amount of request data, ascertain a value of a requested second response waiting time span for providing a first response message in reply to the first request message in such a way that said value of the requested second response waiting time span generally increases with the amount of request data, and send within the first response waiting time span a second request message to the second communication device, the second request message representing a request for a second response waiting time span.

The first request message may be any request or command occurring in the communication between the initiator and the communication device of the invention, to which a response is expected by the initiator device. An example of such request messages is the Attribute Request mentioned above, by which the initiator device asks a target device for communication parameters. Another example is a Data Exchange Protocol Request, as defined in the mentioned standard. The request data may be any data comprised by the first request message.

According to the invention, the second response waiting time span request generally increases with the amount of request data contained in the first request message. This way a long second waiting time span will be requested for a large amount of request data, and a short second waiting time span for a small amount of request data. The invention is based on the observation that a small amount of request data in the first request message sent by the initiator usually requires a relatively short processing time on the side of the target device before the first response message can be sent. On the other hand, a large amount of request data will require a longer processing time on the target side. The communication device of the invention thus allows to ascertain the second waiting time span in correlation to the processing time expected or known to be actually required in an individual communication situation. The communication device of the invention therefore accelerates the NFC communication between the initiator and the target in comparison to the known NFC devices described above.

The amount of request data contained in the first request message is to be understood as the number of bits or bytes of all data contained in the first request message, which are needed by the target device as an input to the algorithm performed for providing an answer to the first request message. The first request message typically follows a protocol format with a defined arrangement of data sections, containing a request data section. In this case, the amount of request data is the number of bits or bytes contained in the request data section. The amount of request data may result from adding the individual amounts of request data of two or more consecutive request messages, if a predetermined length of the request data section is not sufficient to transmit all request data in one request message from the initiator to the target.

The increase of the value of the requested second waiting time span with the amount of request data may be implemented in the form of a mathematical function or in the form of a look-up-table. The increase is linear or nonlinear in alternative embodiments.

The increase of the waiting time span with the amount of request data can also correspond to a step function. While exhibiting a general increase, a step function will also have certain intervals, in which the value of the second waiting time span is constant as the amount of request data increases. The wording used hereinabove that the requested second waiting time span "generally increases" with the amount of request data, is chosen in order to include step functions and similar functions exhibiting zero-slope sections beside positive-slope sections.

The communication device further has an output unit communicating with the processing unit and adapted to transmit the first response message and the second request message to the initiator device. Of course, this refers only to the capability of the output unit to transmit both mentioned messages and does not imply that both messages will be transmitted at the same time.

Thus, there are two ways for responding to the first request message, which provided by the communication device of the invention: a transmission of the first response message, and a transmission of the second request message within the first waiting time span. These two response options can be combined in different ways to form alternative embodiments of the communication device of the present invention. These will be described next below.

In a first embodiment, the communication device is adapted to provide the second request message within the first waiting time span in response to every first request message received. This means, irrespective of whether the first response message can be provided within the first response waiting time span or not, the second request message will be sent by the target device. This embodiment has the advantage of being particularly simple and providing an improvement over prior-art solutions in that the requested second waiting time span is chosen small for small amounts of request data to be processed. The acceleration of NFC communication achieved by this embodiment, however, is in some situations less than that achieved with the second embodiment described next below. For an additional, if small, waiting time span is requested also when in fact no second waiting time span is needed.

In a second embodiment, the communication device is adapted to decide between the two ways of responding to the first request message, in the sense of branching within a process flow. In quintessence, one of the two response alternatives is uniquely allocated to each amount of request data. This can be implemented in different ways, as will be explained in the following by way of two examples.

In one example of the second embodiment, the communication device is adapted to determine or to estimate whether or not the first response message can be generated and provided within the first waiting time span, and to provide the second request message only in case the result of the determination or estimation step indicates that the first response message will not be generated and provided within the first waiting time span. This example may involve employing an algorithm for determining or estimating the processing time needed in dependence on the amount of request data received. This algorithm can additionally take into account the type of request received for determining or estimating the required processing time.

In a second example of the second embodiment the communication device is adapted to compare the amount of request data in the first request message with a predetermined threshold amount of data, and to generate and provide the second request message only in case the amount of request data is larger than the threshold amount of data.

Both examples can also be implemented by means of a look-up table allocating one of the response alternatives to a given amount of request data.

In a third embodiment, the communication device is adapted to operate in either a first or a second mode of operation. The first mode of operation corresponds to that of the first embodiment described above. That is, in the first mode of operation the communication device is adapted to generate and provide at its output the second request message in response to every first request message received and in the second mode of operation the communication device. The second mode of operation corresponds to the second embodiment described above. That is, in the second mode of operation the communication device is adapted to determine or estimate whether or not the first response message will be generated and provided within the first waiting time span, and to provide the second request message only in case the result of the determination or estimation step indicates that the first response message will not be generated and provided within the first waiting time span.

The third embodiment provides an NFC device that can be configured to operate in either the first or the second mode of operation. The following examples provide alternative ways of configuration, which may be used either alone or in combination. Configuration of the mode of operation can in one example be achieved in the manufacturing process only by setting a hardware switch or a software switch. In another example, configuration of the mode of operation is to be performed by user input, be it an input signal triggered manually or by means of a programming device using the NFC interface. In another example, configuration of the mode of operation is a protocol feature of the communication between the initiator and the target. The mode of operation can in this example be negotiated at the beginning of a communication between initiator and target, and it can be switched during communication. In another example, the configuration is performed by an internal control unit of the target device.

An advantageous fourth embodiment, implies the capability of the communication device to always provide the first response message within the first response waiting time span, i.e., without the need for a second response waiting time span. While a communication device of the invention may, during operation, in fact provide all response messages within the first response waiting time span due to a large processing capacity, it makes use of the present invention by being adapted to operate in accordance with the claimed invention.

In the following paragraphs, further embodiments of the communication device of the present invention will be described.

In one embodiment the communication device is additionally adapted to ascertain the value of the second response waiting time span by determining a first value of a first quantity which is correlated with the amount of request data contained in the first request message and by calculating the value of the second response waiting time span in dependence on the first value. The first quantity is for example the number of bits or bytes, which the request data amounts to. This embodiment is advantageous because a variable second waiting time span is determined by the target alone. The initiator does not need to provide any information on the amount of request data, which would require an extension of existing communication protocols.

However, in an alternative embodiment the communication device is adapted to read the first value of the first quantity correlated with the amount of request data from the first request message. This embodiment requires the initiator device to include the first value in the first request message. Therefore, a protocol extension is necessary for implementing this embodiment. On the other hand, this embodiment does not require a calculation of the first value on the side of the target device. The first value can be used immediately to calculate the value of the second response waiting time span. The target can use its processing capacity to process the request data instead of performing an additional calculation related to the waiting time determination. Therefore, the communication between initiator and target is further accelerated.

In a further embodiment the communication device is adapted to ascertain the second response waiting time span according to the formula $$RWT(m)=(1+58*m)/M)*bRWT, \qquad (1)$$

wherein m is the number of request data bytes contained in the first request message, M is a predetermined maximum number of request data bytes, and bRWT is the basic response waiting time span according to the formula $$bRWT=(256*16/fc)*2^{WT},$$

in which fc is a frequency of the operating field used for near field communication by the communication device and WT is a value of a predetermined waiting time span. The basic response waiting time bRWT is calculated according to the present standards, as explained further above. The above formula for the second response waiting time span RWT(m) is especially suited for the case where the second request message is provided in response to every first request message received. However, it may also be used in the second embodiment mentioned above, according to which the processing unit decides between sending a second request message or a first response message.

It should be noted that the constant in formula (1) is not necessarily "1" as well as the factor is not necessarily "58". In fact there are imaginably also other combinations than those mentioned which would lead to a shift of the influence of m, the number of request data bytes. Examples are 2 & 57, 3 & 56, etc.

When implementing the second embodiment, it is more advantageous to provide a communication device that is adapted to ascertain the second response waiting time span according to the formula $$RWT(m)=(2+57*(m-t)/(M-t))*bRWT, \qquad (2)$$

in case it finds the amount of request data in the first request message to be larger than a threshold amount of data. Here, m is a number of request data bytes between a threshold number t of data bytes and a predetermined maximum number M of request data bytes contained in the first request message, and bRWT is the basic response waiting time according to the formula given above.

This embodiment allows for a threshold amount of request data, below which an additional response waiting time span RWT (m) according to the last formula will not be requested. That is, if the amount m of request data is found to be smaller than or equal to the threshold amount t, the processing unit will process the request immediately without generating the second request message. The threshold amount t can be predetermined by proper testing.

It should also be noted here that the constant in formula (2) is not necessarily "2" as well as the factor is not necessarily "57". In fact also other combinations than mentioned are imaginable, which would again lead to a shift of the influence of m, the number of request data bytes. Examples are 3 & 56, 4 & 55, etc., as well as 1 & 58.

Depending on the allowable processing complexity in view of processing speed and chip area used by the processing unit, several threshold amounts $t_i$ of request data may be predetermined for different request types i=1, 2, . . . r. This way, average processing times needed for processing request messages of different request types can be taken into account. For there are some request types that are generally processed faster than others. For instance, the smart card operations "select file", "read data", and "write data" operations are processed quickly, whereas "erase" and "authentify" operations need more processing time.

According to a second aspect of the invention a method for half-duplex near-field communication between a first communication device (hereinafter also referenced as "target" or "target device") and a second communication device (hereinafter also referenced as "initiator" or "initiator device") is provided, wherein the first communication device:
receives a first request message from the second communication device, which is supposed to be answered within a first response waiting time span, and which contains an amount of request data,
ascertains a value of a requested second response waiting time span for providing a first response message in reply to the first request message in such a way that said value of the requested second response waiting time span generally increases with the amount of request data, and
sends within the first response waiting time span a second request message to the second communication device, the second request message representing a request for a second response waiting time span.

The method of the second aspect of the invention reflects the communication capabilities of the communication device of the first aspect of the invention. Therefore, the embodiments and advantages of the method of the second aspect of the invention correspond to those explained in the context of the communication device according to the first aspect of the invention.

Note that also for the method of the second aspect of the invention there are alternative first and second embodiments, as it was described for the communication device of the first aspect of the invention. That is, a first embodiment of the method of the invention concerns sending a second request message from the target to the initiator in response to every first request message received. In a second embodiment there is a step of deciding between the two ways of responding to the first request; i.e. the target device either sends, within a first response waiting time span, a first response message to the initiator device in reply to the first request message or sends, within the first response waiting time span, a second request message to the initiator device, the second request message representing a request for a second response waiting time span to be granted for providing the first response message.

According to a third aspect of the invention a data medium containing coded instructions, which are to be interpreted by a communication device adapted to communicate with at least one second communication device in a half-duplex near-field communication scheme, the instructions including that the following operations are performed:
receiving a first request message from the second communication device which is supposed to be answered within a first response waiting time span, and which contains an amount of request data,
ascertaining a value of a requested second response waiting time span for providing a first response message in reply to the first request message in such a way that said value of the requested second response waiting time span generally increases with the amount of request data, and
sending within the first response waiting time span a second request message to the second communication device, the second request message representing a request for a second response waiting time span.

The data medium of the third aspect of the invention may be designed to be integrated into an NFC communication device, which will by integrating the data medium form a communication device according to the first aspect of the invention. The data medium may for instance be a read-only memory (ROM) containing the coded instructions in the form of an executable program code, to which the processing unit of the communication device has access. In another embodiment the data medium of the third aspect of the invention is a hard-disk type memory, either local or remote from an NFC device. The coded instructions are for instance provided on the medium to be copied from the hard disk into a random access memory (RAM) of an NFC device, in order to form a communication device according to the first aspect of the invention. In another embodiment the data medium is a portable read only memory such as a compact disc (CD) containing the coded instructions. The compact disc can be used to download the coded instructions to a RAM of an NFC device for setting up or initializing the device to operate according to the method of the second aspect of the invention.

The embodiments of the data medium of the third aspect of the invention correspond to embodiments of the method of the second aspect of the invention and of the communication device of the first aspect of the invention.

BRIEF DESCRIPTION OF THE DRAWINGS

In the following, several embodiments of the communication device and of the method of the invention will be explained with reference to the enclosed figures, wherein said embodiments cannot serve as a base to narrow the broad scope of the invention.

DESCRIPTION OF EMBODIMENTS

Figure 1:
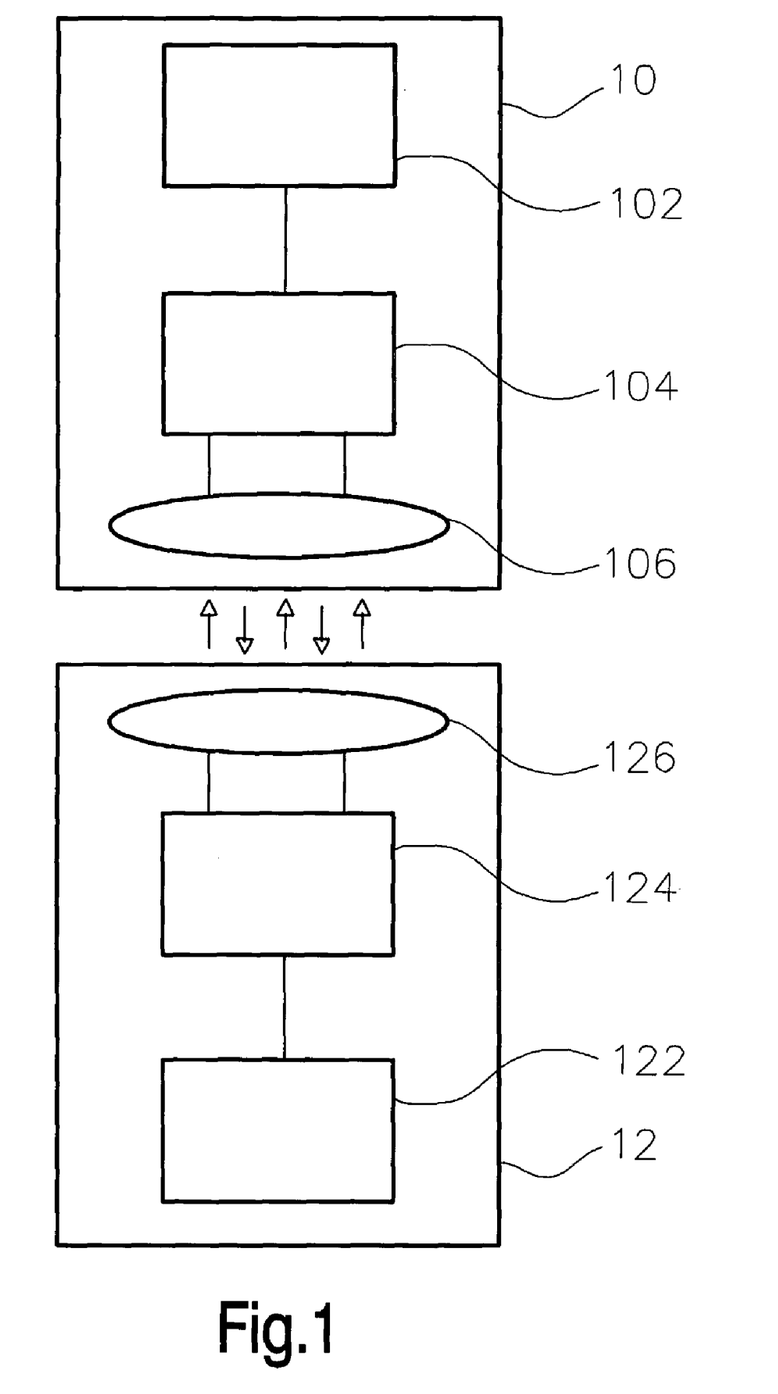
FIG. 1 shows a block diagram of two communication devices adapted for near-field communication.

FIG. 1 shows a block diagram of a first communication device 10 and a second communication device 12. For purposes of illustration only, first communication device 10 is a personal digital assistant (PDA) including a digital camera, and second communication device 12 is a television (TV) set, both with NFC capability. All functions other than those related to NFC communication are summarized by block 102 in first communication device 10. Similarly, block 122 in second communication device 12 provides technical functions other than those related to NFC communication.

First communication device 10 further comprises an NFC unit 104 which is connected to an antenna 106. As well second communication device 12 further comprises an NFC unit 124 which is connected to an antenna 126. To establish an NFC link, the devices 10 and 12 are positioned with their antennas 106 and 126 at a mutual distance of 20 cm or less. The NFC units 104 and 124 will then control the further setup of the communication link according to known protocol steps.

After NFC communication is set up according to known protocols, the communication devices 10 and 12 are ready to exchange data. For instance, a digital image stored in the first communication device 10 (PDA) can be copied to a memory provided in the second communication device 12 (TV set), in order to display the digital image on the screen of the second communication device 12 (TV set).

Another example of an NFC communication using the same structure as shown in FIG. 1 is the exchange of communication parameters in setting up a Bluetooth communication link when first communication device 10 is a laptop computer and second communication device 12 is a desktop computer for example.

Figure 2:
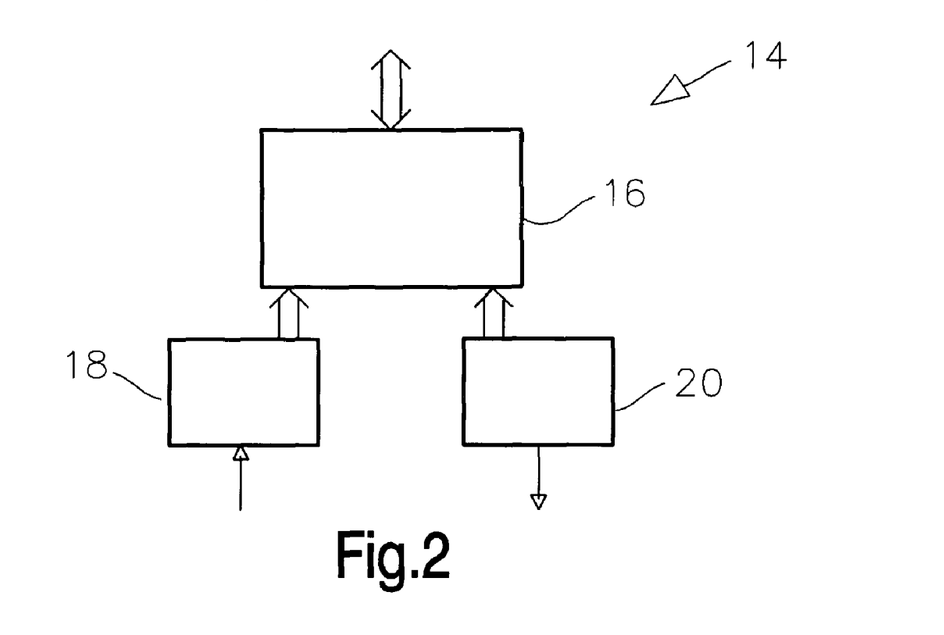
FIG. 2 shows a block diagram of an embodiment of a processing unit of a communication device of the invention.

FIG. 2 shows a block diagram of an NFC unit 14 for use in a communication device of the invention. NFC unit 14 may for example be used in the communication devices 10 and 12 of FIG. 1.

NFC unit 14 comprises a processing unit 16, an input unit 18 and an output unit 20. Input unit 18 and output unit 20 are connected to an antenna (not shown). Processing unit 16 is connected to the input unit 18 and the output unit 20. It may further be connected to control circuitry (not shown) of a device it is integrated into, as shown in FIG. 1 for example by the connection between block 122 and NFC unit 124.

In operation, electromagnetic signals received by the antenna are transformed into electric signals and fed into the input unit 18. The input unit 18 demodulates and decodes incoming signals and forwards the demodulated and decoded signals to the processing unit 16.

The processing unit 16 interprets the incoming signals. For instance, it detects the type of request message received from a second communication device 12 (initiator) and processes the incoming request data according to an appropriate algorithm in order to generate and provide at its output a response message in reply to the request message received. The signals corresponding to the response message are fed into an output unit 20, which provides coding and modulation and feeds the coded and modulated electrical signals to the antenna for transmission to the second communication device 12.

Further details of the operation of the processing unit 16 in accordance with the invention will be described next with reference to FIGS. 3 to 6.

Figure 3:
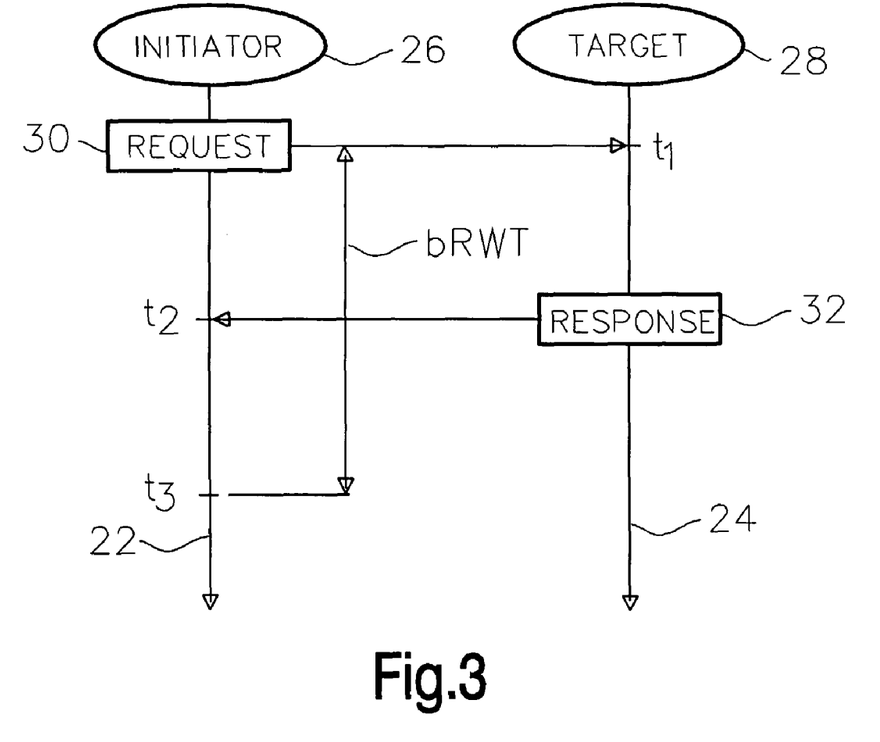
FIG. 3 shows a flow diagram of a basic request-response communication between an initiator device and a target device.

FIG. 3 shows the communication sequence performed during an exchange of request and response messages between a first communication device 28 (target) and a second communication device 26 (initiator). Two arrows 22 and 24 represent time axes with time proceeding in the direction of the arrow tip. Along time axis 22 messages sent by second communication device 26 are shown. Along time axis 24 messages sent by first communication device 28 are shown.

The second communication device 26 sends a first request message 30 to the first communication device 28 at a first point in time indicated as $t_1$. An example of the first request message 30 is a Data Exchange Protocol Request, short DEP_REQ, for instance a DEP_REQ addressed to a target assigned to a Device Identifier DID=1, which carries the payload (or user) data bytes.

Counted from $t_1$ the second communication device 26 will wait for a response from the first communication device 28 for a basic response waiting time span bRWT until $t_3$, as indicated by a double arrow parallel to the time axis 22 and marked correspondingly. In the example given in FIG. 3 the first communication device 28 provides its first response message 32 at a point in time $t_2$, which is before the end of the basic response waiting time span bRWT at $t_3$. Thus, the case shown in FIG. 3 corresponds to an embodiment in which the first communication device 28 only sends a request for a second response waiting time span RWT(m) if it is necessary.

Figure 4:
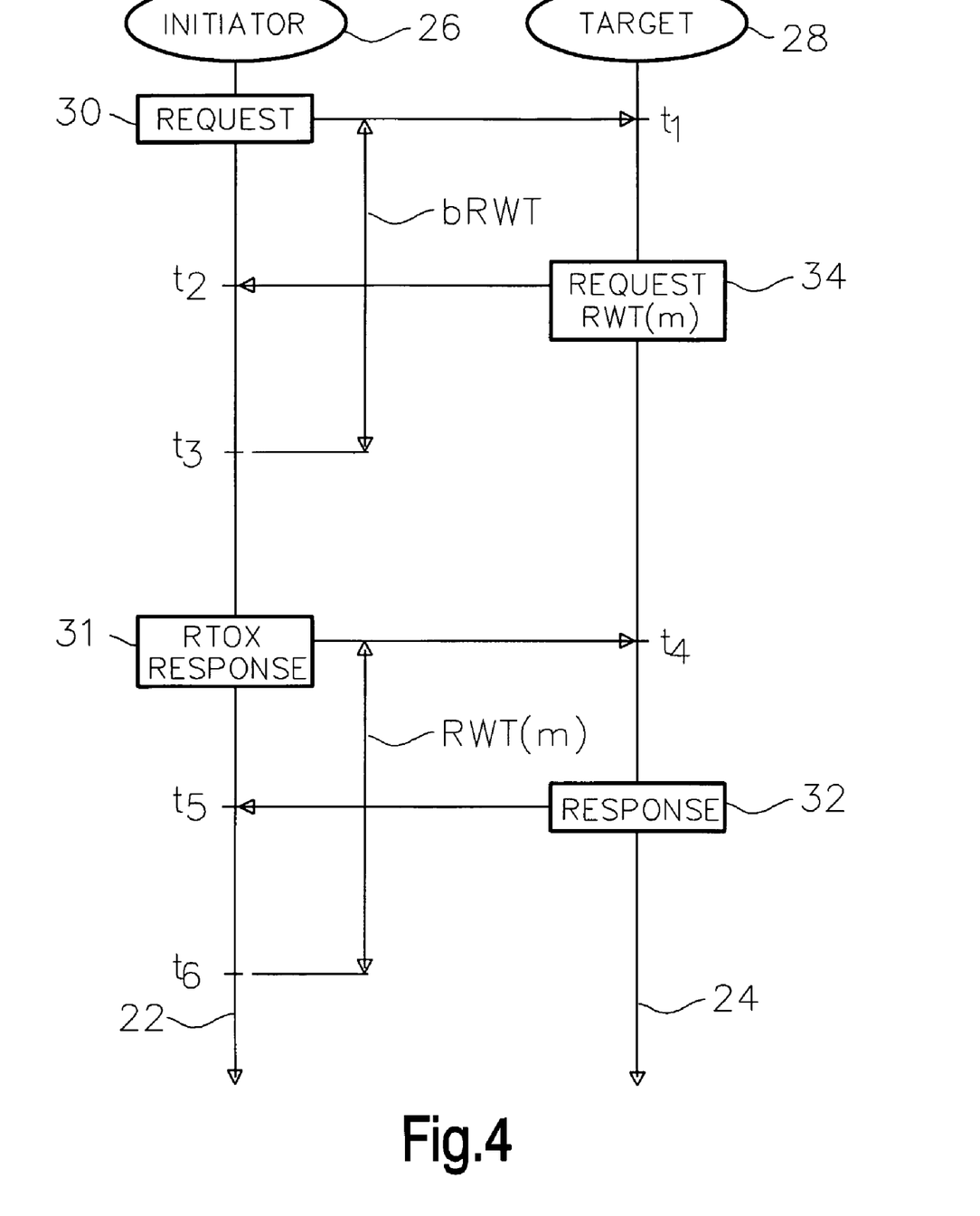
FIG. 4 shows a flow diagram of a request-response communication between an initiator and a target device including a request for an additional waiting time span.

FIG. 4 shows a second communication flow between second communication device 26 and first communication device 28 in a similar diagram. Again, the second communication device 26 sends a first request message 30 to the first communication device 28 at $t_1$. Before the end of the basic response waiting time bRWT at $t_2$, the first communication device 28 sends a second request message 34 for a second response waiting time span RWT(m). The value of the second response waiting time span RWT(m) is chosen by the first communication device 28 in dependence on the amount of request data contained in the first request message 30.

At t₄, the second communication device 26 responds by sending an RTOX response message 31 granting the requested second response waiting time span RWT(m). The additional second response waiting time span RWT(m) will be counted from t₄ on, as indicated by the double arrow marked RWT(m). Before the end of the second response waiting time span RWT(m), the first communication device 28 sends the first response message 32 at t₅.

The communication flow shown in FIG. 4 is in one embodiment used as an alternative for the communication flow shown in FIG. 3. This corresponds to an embodiment, in which the first communication device 28 will request an additional response waiting time span RWT(m) in response to every first request message 30 received from the second communication device 26.

However, in an alternative embodiment, the communication flow of FIG. 4 will only be followed, if the first communication device 28 actually needs more time to process the first request message 30 than the basic response waiting time span bRWT. This will be explained in more detail below in the context of the flow diagram of FIG. 6.

Figure 5:
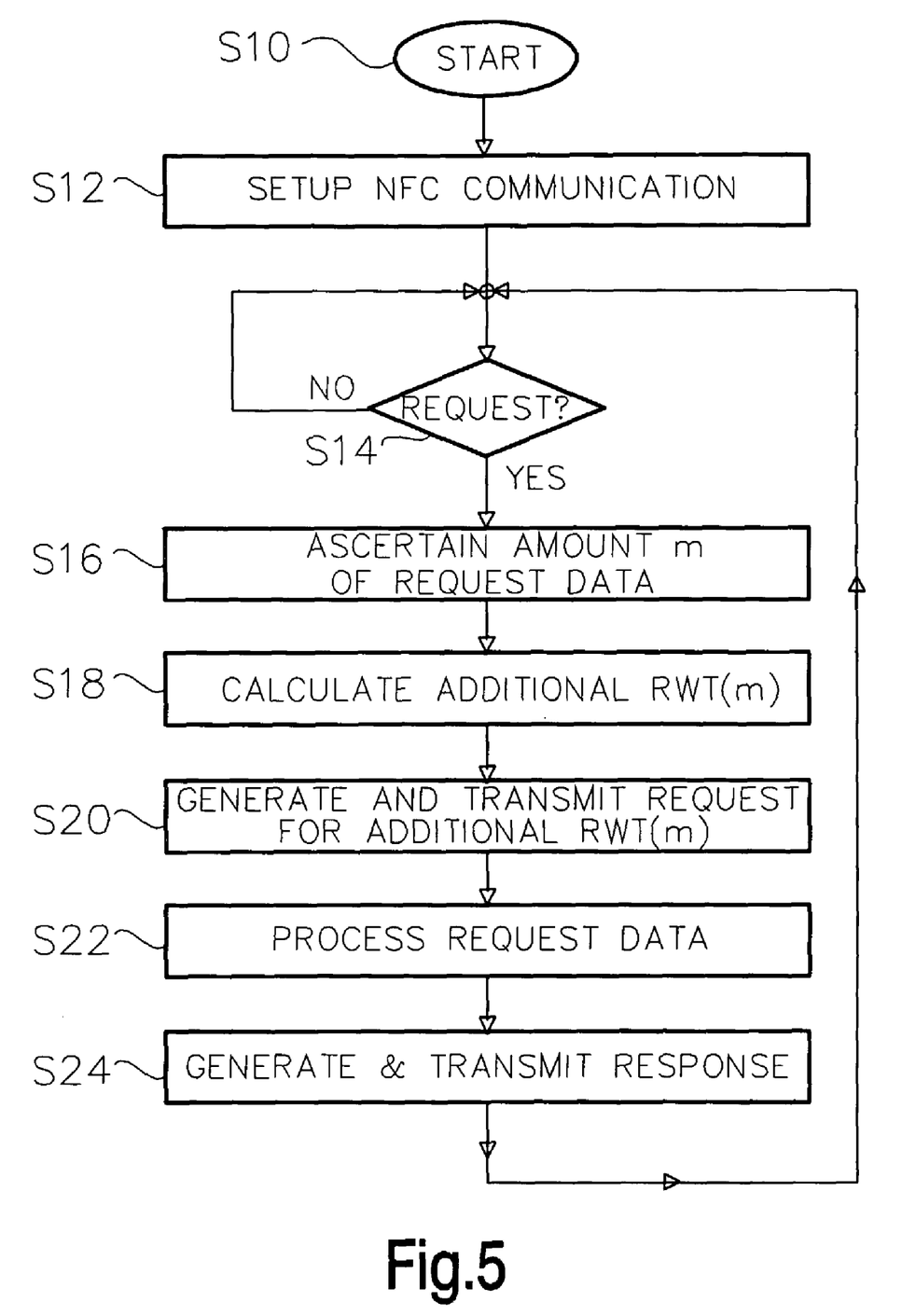
FIG. 5 shows a flow diagram of a first embodiment of a request processing method performed by a target device.

FIG. 5 shows a flow diagram of an embodiment of a method for NFC communication. The flow diagram represents process steps taken by the first communication device 28 of FIG. 4. The flow diagram of FIG. 5 also represents an embodiment of an executable program file containing coded instructions implementing the method steps of the flow diagram, which will be explained next below.

The method is started with a step S10. In a step S12 NFC communication is set up between a first communication device 28 and a second communication device 26 following known protocol steps, which are not shown in further detail. At step S14 the first communication device 28 checks whether a first request message 30 has been received from the second communication device 26. As long as no first request message 30 has been received, step S14 is performed repeatedly.

When a first request message 30 has been received by the first communication device 28, the first communication device 28 proceeds with step 16 and ascertains an amount m of request data bytes contained in the first request message 30 received. In the following step S18 the first communication device 28 calculates the value of the second response waiting time span RWT(m) to be requested from the second communication device 26. The corresponding second request message 34 for an additional second response waiting time span RWT(m) will be generated and transmitted in step S20. In step S22 the request data contained in the first request message 30 received are processed in order to generate and transmit a first response message 32 at step S24. After having transmitted the first response message 32 the method of FIG. 5 branches back to step S14 and waits for a next first request message 30 from the second communication device 26.

The method flow just described corresponds to the case where the first communication device 28 provides a second request message 34 for an additional response waiting time span RWT(m) in reply to every first request message 30 received from the second communication device 26. In this case the formula (1) of the second response waiting time span RWT(m), which was given above, is preferably used.

Figure 6:
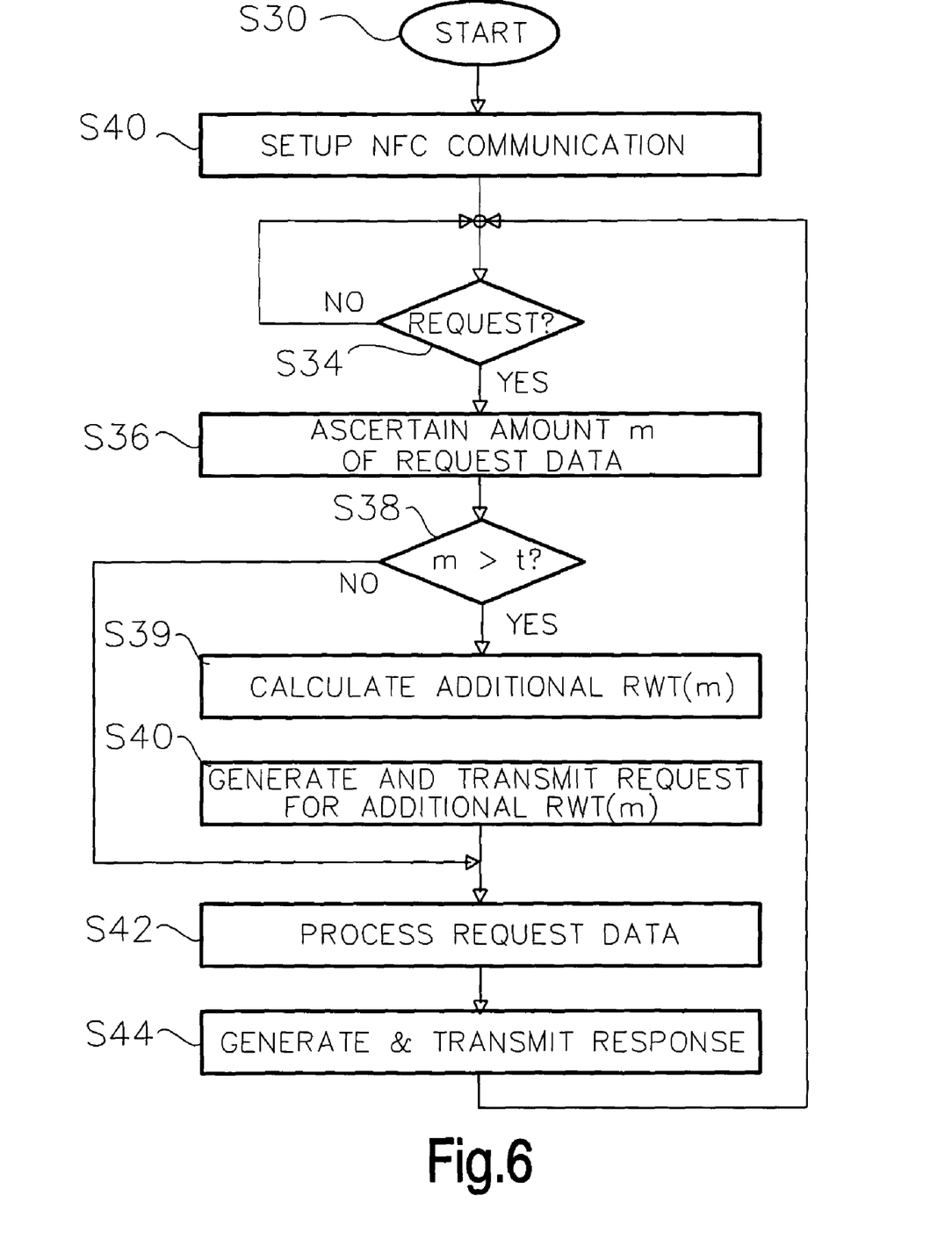
FIG. 6 shows a second embodiment of a request processing method performed by a target device.

FIG. 6 shows a flow diagram of an alternative embodiment of a method for NFC communication. Again only the steps performed by the first communication device 28 are shown. The method is started in step S30. In step S32 NFC communication is set up between a first communication device 28 and a second communication device 26. In step S34 the first communication device 28 checks whether a first request message 30 has been received from the second communication device 26. As long as no first request message 30 has been received, step S34 is performed repeatedly. When a first request message 30 has been received by the first communication device 28, the first communication device 28 proceeds to step 36 and ascertains the amount m of request data bytes contained in the first request message 30 received.

In contrast to the embodiment of FIG. 5, the first communication device 28 checks in step S38 whether the amount m of request data bytes is larger then a threshold amount t. If that is the case, the first communication device 28 calculates the value of the second response waiting time span RWT(m) in step S39 and will generate and transmit a second request message 34 for an additional response waiting time span RWT(m) in step S40. In this case RWT(m) is preferably determined according to formula (2) given above.

The first communication device 28 will then proceed with processing the request data in step S42 in order to generate and transmit a first response message 32 at step S44. In case the first communication device 28 finds in step S38 that the amount of request data bytes is smaller or equal than the threshold amount t, the first communication device 28 will immediately perform step S42 and process the request data. In this case, the first response message 32 will be provided within the basic response waiting time bRWT.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A communication device adapted to communicate with at least one second communication device in a half-duplex near-field communication scheme, further adapted to:
   receive a first request message from the second communication device which is supposed to be answered within a first response waiting time span, and which contains an amount of request data,
   ascertain a value of a requested second response waiting time span for providing a first response message in reply to the first request message in such a way that said value of the requested second response waiting time span generally increases with the amount of request data, and
   send within the first response waiting time span a second request message to the second communication device, the second request message representing a request for a second response waiting time span; and
   ascertain the second response waiting time span according to the formula $$RWT(m) = (1 + 58*m)/M) * bRWT,$$

wherein m is the number of request data bytes contained in the first request message, M is a predetermined maximum number of request data bytes, and bRWT is a basic response waiting time span according to the formula $$bRWT=(256*16/fc)*2^{WT},$$

in which fc is a frequency of the operating field used for near field communication by the communication device and WT is a value of a predetermined waiting time span.

2. A communication device adapted to communicate with at least one second communication device in a half-duplex near-field communication scheme, further adapted to:
   receive a first request message from the second communication device which is supposed to be answered within a first response waiting time span, and which contains an amount of request data,
   ascertain a value of a requested second response waiting time span for providing a first response message in reply to the first request message in such a way that said value of the requested second response waiting time span generally increases with the amount of request data,
   send within the first response waiting time span a second request message to the second communication device, the second request message representing a request for a second response waiting time span; and
   in case it finds the amount of request data in the first request message to be larger than a threshold amount of data, ascertain the second response waiting time span according to the formula $$RWT(m)=(2+57*(m-t)/(M-t))*bRWT,$$

wherein m is a number of request data bytes between a threshold number t of data bytes and a predetermined maximum number of request data bytes M contained in the first request message,
and bRWT is a basic response waiting time according to the formula $$bRWT=(256*16/fc)*2^{WT},$$

in which fc is a frequency of the operating field used for near field communication by the communication device and WT is a value of a predetermined waiting time.

3. The communication device of claim 1, further adapted to operate in either a first or a second mode of operation, wherein
   in the first mode of operation the communication device is adapted to generate and provide at its output the second request message in response to every first request message received, and
   in the second mode of operation the communication device is adapted to determine or estimate whether or not the first response message will be generated and provided within the first waiting time span, and to provide the second request message only in case the result of the determination or estimation step indicates that the first response message will not be generated and provided within the first waiting time span.

4. A method for half-duplex near-field communication between a first communication device and a second communication device, wherein the first communication device:
   receives a first request message from the second communication device which is supposed to be answered within a first response waiting time span, and which contains an amount of request data,
   ascertains a value of a requested second response waiting time span for providing a first response message in reply to the first request message in such a way that said value of the requested second response waiting time span generally increases with the amount of request data,
   sends within the first response waiting time span a second request message to the second communication device, the second request message representing a request for a second response waiting time span; and
   wherein the first communication device calculates the value of the second response waiting time according to the formula:

$$RWT(m)=(1+58*m)/M)*bRWT,$$

wherein m is the number of request data bytes contained in the first request message, M is a predetermined maximum number of request data bytes, and bRWT is a basic response waiting time according to the formula $$bRWT=(256*16/fc)*2^{WT},$$

in which fc is a frequency of the operating field used for near field communication by the first communication device and WT is a value of a predetermined waiting time.

5. The method of claim 4, wherein the first communication device, in case it finds the amount of request data (m) in the first request message to be larger than a threshold amount of request data, calculates the second response waiting time span according to the formula $$RWT(m)=(2+57*(m-t)/(M-t))*bRWT,$$

wherein m is a number of request data bytes between a threshold number t of data bytes and a predetermined maximum number M of request data bytes contained in the first request message, and bRWT is a basic response waiting time according to the formula $$bRWT=(256*16/fc)*2^{WT},$$

in which fc is a frequency of the operating field used for near field communication by the communication device and WT is a value of a predetermined waiting time.

6. The method of claim 4, comprising a step of switching between a first and a second mode of operation, wherein
   in the first mode of operation the first communication device sends the second request message to the second communication device in reply to every first request message received, and
   in the second mode of operation the first communication device determines or estimates whether or not the first response message will be generated and provided within the first waiting time span, and provides the second request message only in case the result of the determination step indicates that the first response message will not be generated and provided within the first waiting time span.

* * * * *